(12) United States Patent
Asahara et al.

(10) Patent No.: US 11,610,151 B2
(45) Date of Patent: Mar. 21, 2023

(54) DISTRIBUTION SYSTEM, DATA MANAGEMENT APPARATUS, DATA MANAGEMENT METHOD, AND COMPUTER-READABLE RECORDING MEDIUM

(71) Applicant: NEC CORPORATION, Tokyo (JP)

(72) Inventors: Masato Asahara, Tokyo (JP); Ryohei Fujimaki, Tokyo (JP); Yusuke Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 636 days.

(21) Appl. No.: 16/619,829

(22) PCT Filed: Jun. 5, 2018

(86) PCT No.: PCT/JP2018/021600
§ 371 (c)(1),
(2) Date: Dec. 5, 2019

(87) PCT Pub. No.: WO2018/225747
PCT Pub. Date: Dec. 13, 2018

(65) Prior Publication Data
US 2020/0134507 A1 Apr. 30, 2020

Related U.S. Application Data

(60) Provisional application No. 62/515,734, filed on Jun. 6, 2017.

(51) Int. Cl.
*G06F 1/00* (2006.01)
*G06N 20/00* (2019.01)
(Continued)

(52) U.S. Cl.
CPC ............... *G06N 20/00* (2019.01); *G06N 5/04* (2013.01); *G06N 7/00* (2013.01)

(58) Field of Classification Search
CPC ............. G06N 20/00; G06N 5/04; G06N 7/00
(Continued)

(56) References Cited

U.S. PATENT DOCUMENTS 10,091,231 B1 * 10/2018 Gates .................. H04L 63/1425
10,460,255 B2 * 10/2019 Nagaraju ............ H04L 43/0817
(Continued)

OTHER PUBLICATIONS

International Preliminary Report on Patentability with Written Opinion dated Dec. 19, 2019, issued by the International Bureau in application No. PCT/JP2018/021600.
(Continued)

*Primary Examiner* — Volvick Derose
(74) *Attorney, Agent, or Firm* — Sughrue Mion, PLLC

(57) ABSTRACT

A distribution system 100 includes a data management apparatus 10 and a plurality of calculators 20 that execute machine learning. The data management apparatus 10 includes a data acquisition unit 11 that acquires information regarding training data held in a memory 21 of each of the calculators 20, from the calculators 20, and a data rearrangement unit 12 that determines training data that is to be held in the memory 21 of each of the calculators 20, based on characteristics of the machine learning processes that are executed by the calculators 20, and the information acquired from the calculators.

16 Claims, 22 Drawing Sheets

(51) Int. Cl.
*G06N 5/04* (2023.01)
*G06N 7/00* (2023.01)

(58) Field of Classification Search
USPC .......................................................... 706/12
See application file for complete search history.

(56) References Cited

U.S. PATENT DOCUMENTS

| | | | | |
|---|---|---|---|---|
| 10,536,351 | B2* | 1/2020 | Nagaraju | G06N 20/00 |
| 10,847,266 | B1* | 11/2020 | Ross | G06Q 50/01 |
| 11,328,964 | B2* | 5/2022 | Bhatia | G06N 20/20 |
| 2014/0245045 | A1* | 8/2014 | Haruki | G06F 1/3287 |
| | | | | 713/323 |
| 2016/0036740 | A1* | 2/2016 | Barber | G06F 40/263 |
| | | | | 704/3 |
| 2017/0060993 | A1* | 3/2017 | Pendar | G06F 16/334 |
| 2017/0061329 | A1* | 3/2017 | Kobayashi | G06N 20/00 |
| 2017/0109322 | A1* | 4/2017 | McMahan | G06N 20/00 |
| 2017/0293863 | A1* | 10/2017 | Hasuko | G06F 16/283 |
| 2017/0372096 | A1* | 12/2017 | Yousfi | G06F 21/6254 |
| 2017/0372230 | A1* | 12/2017 | Kuromatsu | G06N 20/00 |
| 2018/0014777 | A1* | 1/2018 | Amir | A61B 5/4839 |
| 2018/0165757 | A1* | 6/2018 | Gelber | G06Q 40/08 |
| 2018/0357201 | A1* | 12/2018 | Ando | G06N 20/00 |
| 2022/0117509 | A1* | 4/2022 | Garff | A61B 5/0531 |

OTHER PUBLICATIONS

Xiangrui Meng et al., "MLlib: Machine Learning in Apache Spark", Journal of Machine Learning Research, Apr. 2016, pp. 1-7, vol. 17.
Evan R. Sparks et al., "Automating Model Search for Large Scale Machine Learning", ACM SoCC, Aug. 27-29, 2015, 13 pgs.
Ryoji Wakayama et al., "Parallel distributed learning of random forests based on covariate shift adaptation", D, 2016, pp. 737-746, vol. J99-D, No. 8.
International Search Report for PCT/JP2018/021600 dated Sep. 4, 2018 (PCT/ISA/210).

* cited by examiner

Fig.2

SERVER A

| SAMPLE ID | FEATURE AMOUNT 1 | ... | FEATURE AMOUNT n | PREDICTION TARGET VARIABLE |
|---|---|---|---|---|
| 1 | 1.8 | ... | 2.5 | 1 |
| 2 | 3.4 | ... | -2.9 | 1 |

SERVER B

| SAMPLE ID | FEATURE AMOUNT 1 | ... | FEATURE AMOUNT n | PREDICTION TARGET VARIABLE |
|---|---|---|---|---|
| 3 | 2.3 | ... | 3.8 | -1 |
| 4 | 0.7 | ... | -10.4 | -1 |

SERVER C

| SAMPLE ID | FEATURE AMOUNT 1 | ... | FEATURE AMOUNT n | PREDICTION TARGET VARIABLE |
|---|---|---|---|---|
| 5 | 9.8 | ... | 3.7 | 1 |
| 6 | -3.5 | ... | 2.3 | 1 |

Fig.3

| SAMPLE ID | PREDICTION TARGET VARIABLE | STORAGE SERVER |
|---|---|---|
| 1 | 1 | SERVER A |
| 2 | 1 | SERVER A |
| 3 | -1 | SERVER B |
| 4 | -1 | SERVER B |
| 5 | 1 | SERVER C |
| 6 | 1 | SERVER C |

Fig.4

| SAMPLE ID | PREDICTION TARGET VARIABLE | STORAGE SERVER | REARRANGEMENT DESTINATION |
|---|---|---|---|
| 1 | 1 | SERVER A | SERVER A |
| 2 | 1 | SERVER A | SERVER B |
| 3 | -1 | SERVER B | SERVER A, SERVER C |
| 4 | -1 | SERVER B | SERVER B |
| 5 | 1 | SERVER C | SERVER C |
| 6 | 1 | SERVER C | NONE |

Fig.5

SERVER A

| SAMPLE ID | FEATURE AMOUNT 1 | ... | FEATURE AMOUNT n | PREDICTION TARGET VARIABLE |
|---|---|---|---|---|
| 1 | 1.8 | ... | 2.5 | 1 |
| 3 | 2.3 | ... | 3.8 | -1 |

SERVER B

| SAMPLE ID | FEATURE AMOUNT 1 | ... | FEATURE AMOUNT n | PREDICTION TARGET VARIABLE |
|---|---|---|---|---|
| 2 | 3.4 | ... | -2.9 | 1 |
| 4 | 0.7 | ... | -10.4 | -1 |

SERVER C

| SAMPLE ID | FEATURE AMOUNT 1 | ... | FEATURE AMOUNT n | PREDICTION TARGET VARIABLE |
|---|---|---|---|---|
| 5 | 9.8 | ... | 3.7 | 1 |
| 3 | 2.3 | ... | 3.8 | -1 |

Fig.8

| SERVER | MEMORY CAPACITY |
|---|---|
| SERVER A | 2 SAMPLE |
| SERVER B | 2 SAMPLE |
| SERVER C | 2 SAMPLE |

Fig.9

SERVER A

| SAMPLE ID | PREDICTION TARGET VARIABLE | REARRANGEMENT DESTINATION |
|---|---|---|
| 1 | 1 | SERVER A |
| 2 | 1 | SERVER C |

SERVER B

| SAMPLE ID | PREDICTION TARGET VARIABLE | REARRANGEMENT DESTINATION |
|---|---|---|
| 3 | −1 | SERVER A |
| 4 | −1 | SERVER A |

SERVER C

| SAMPLE ID | PREDICTION TARGET VARIABLE | REARRANGEMENT DESTINATION |
|---|---|---|
| 5 | 1 | SERVER B, SERVER C |
| 6 | 1 | SERVER C |

Fig.10

SERVER A

| SAMPLE ID | PREDICTION TARGET VARIABLE | REARRANGEMENT DESTINATION |
|---|---|---|
| 1 | 1 | SERVER A |
| 2 | 1 | SERVER C |
| 3 | -1 | SERVER A |
| 4 | -1 | SERVER A |

SERVER C

| SAMPLE ID | PREDICTION TARGET VARIABLE | REARRANGEMENT DESTINATION |
|---|---|---|
| 5 | 1 | SERVER B, SERVER C |
| 6 | 1 | SERVER C |

Fig.11

SERVER A

| SAMPLE ID | PREDICTION TARGET VARIABLE | REARRANGEMENT DESTINATION |
|---|---|---|
| 1 | 1 | SERVER A |
| 2 | 1 | SERVER C |
| 3 | -1 | SERVER A |
| 4 | -1 | SERVER B |

SERVER C

| SAMPLE ID | PREDICTION TARGET VARIABLE | REARRANGEMENT DESTINATION |
|---|---|---|
| 5 | 1 | SERVER B, SERVER C |
| 6 | 1 | SERVER C |

Fig.12

SERVER A

| SAMPLE ID | PREDICTION TARGET VARIABLE | REARRANGEMENT DESTINATION |
|---|---|---|
| 1 | 1 | SERVER A |
| 2 | 1 | SERVER C |
| 3 | -1 | SERVER A |
| 4 | -1 | SERVER B |
| 5 | 1 | SERVER B, SERVER C |
| 6 | 1 | SERVER C |

Fig.13

SERVER A

| SAMPLE ID | PREDICTION TARGET VARIABLE | REARRANGEMENT DESTINATION |
|---|---|---|
| 1 | 1 | SERVER A |
| 2 | 1 | SERVER C |
| 3 | -1 | SERVER A |
| 4 | -1 | SERVER B |
| 5 | 1 | SERVER B, SERVER C |
| 6 | 1 | NONE |

Fig.14

SERVER A

| SAMPLE ID | PREDICTION TARGET VARIABLE | REARRANGEMENT DESTINATION |
|---|---|---|
| 1 | 1 | SERVER A |
| 2 | 1 | SERVER C |
| 3 | -1 | SERVER A |
| 4 | -1 | SERVER B, SERVER C |
| 5 | 1 | SERVER B |
| 6 | 1 | NONE |

Fig.15

SERVER A

| SAMPLE ID | FEATURE AMOUNT 1 | ... | FEATURE AMOUNT n | PREDICTION TARGET VARIABLE |
|---|---|---|---|---|
| 1 | 1.8 | ... | 2.5 | 1 |
| 3 | 2.3 | ... | 3.8 | -1 |

SERVER B

| SAMPLE ID | FEATURE AMOUNT 1 | ... | FEATURE AMOUNT n | PREDICTION TARGET VARIABLE |
|---|---|---|---|---|
| 4 | 0.7 | ... | -10.4 | -1 |
| 5 | 9.8 | ... | 3.7 | 1 |

SERVER C

| SAMPLE ID | FEATURE AMOUNT 1 | ... | FEATURE AMOUNT n | PREDICTION TARGET VARIABLE |
|---|---|---|---|---|
| 2 | 3.4 | ... | -2.9 | 1 |
| 4 | 0.7 | ... | -10.4 | -1 |

Fig.19

MEMORY OF CALCULATION PROCESSING SERVER 220

| SAMPLE ID | FEATURE AMOUNT 1 | ... | FEATURE AMOUNT n | PREDICTION TARGET VARIABLE |
|---|---|---|---|---|
| 1 | 1.8 | ... | 2.5 | 1 |
| 2 | 3.4 | ... | −2.9 | 1 |

MEMORY OF CALCULATION PROCESSING SERVER 221

| SAMPLE ID | FEATURE AMOUNT 1 | ... | FEATURE AMOUNT n | PREDICTION TARGET VARIABLE |
|---|---|---|---|---|
| 3 | 2.3 | ... | 3.8 | −1 |
| 4 | 0.7 | ... | −10.4 | −1 |

MEMORY OF CALCULATION PROCESSING SERVER 222

| SAMPLE ID | FEATURE AMOUNT 1 | ... | FEATURE AMOUNT n | PREDICTION TARGET VARIABLE |
|---|---|---|---|---|
| 5 | 9.8 | ... | 3.7 | 1 |
| 6 | −3.5 | ... | 2.3 | 1 |

Fig.20

CALCULATION PROCESSING SERVER 220

| SAMPLE ID | FEATURE AMOUNT 1 | ... | FEATURE AMOUNT n | PREDICTION TARGET VARIABLE |
|---|---|---|---|---|
| 1 | 1.8 | ... | 2.5 | 1 |
| 2 | 3.4 | ... | -2.9 | 1 |

CALCULATION PROCESSING SERVER 221

| SAMPLE ID | FEATURE AMOUNT 1 | ... | FEATURE AMOUNT n | PREDICTION TARGET VARIABLE |
|---|---|---|---|---|
| 3 | 2.3 | ... | 3.8 | -1 |
| 4 | 0.7 | ... | -10.4 | -1 |

CALCULATION PROCESSING SERVER 222

| SAMPLE ID | FEATURE AMOUNT 1 | ... | FEATURE AMOUNT n | PREDICTION TARGET VARIABLE |
|---|---|---|---|---|
| 5 | 9.8 | ... | 3.7 | 1 |
| 6 | -3.5 | ... | 2.3 | 1 |

MACHINE LEARNING ENGINE

MACHINE LEARNING ENGINE

MACHINE LEARNING ENGINE

Fig.21

CALCULATION PROCESSING SERVER 220

| SAMPLE ID | FEATURE AMOUNT 1 | ... | FEATURE AMOUNT n | PREDICTION TARGET VARIABLE | REARRANGEMENT DESTINATION |
|---|---|---|---|---|---|
| 1 | 1.8 | ... | 2.5 | 1 | SERVER 220 |
| 2 | 3.4 | ... | -2.9 | 1 | SERVER 220 |

CALCULATION PROCESSING SERVER 221

| SAMPLE ID | FEATURE AMOUNT 1 | ... | FEATURE AMOUNT n | PREDICTION TARGET VARIABLE | REARRANGEMENT DESTINATION |
|---|---|---|---|---|---|
| 3 | 2.3 | ... | 3.8 | -1 | SERVER 221 |
| 4 | 0.7 | ... | -10.4 | -1 | SERVER 220 |

CALCULATION PROCESSING SERVER 222

| SAMPLE ID | FEATURE AMOUNT 1 | ... | FEATURE AMOUNT n | PREDICTION TARGET VARIABLE | REARRANGEMENT DESTINATION |
|---|---|---|---|---|---|
| 5 | 9.8 | ... | 3.7 | 1 | SERVER 221<br>SERVER 222 |
| 6 | -3.5 | ... | 2.3 | 1 | SERVER 222 |

Fig.22

CALCULATION PROCESSING SERVER 220

| SAMPLE ID | FEATURE AMOUNT 1 | ... | FEATURE AMOUNT n | PREDICTION TARGET VARIABLE |
|---|---|---|---|---|
| 1 | 1.8 | ... | 2.5 | 1 |
| 2 | 3.4 | ... | -2.9 | 1 |
| 4 | 0.7 | ... | -10.4 | -1 |

 CANNOT BE READ INTO MEMORY

CALCULATION PROCESSING SERVER 221

| SAMPLE ID | FEATURE AMOUNT 1 | ... | FEATURE AMOUNT n | PREDICTION TARGET VARIABLE |
|---|---|---|---|---|
| 3 | 2.3 | ... | 3.8 | -1 |
| 5 | 9.8 | ... | 3.7 | 1 |

CALCULATION PROCESSING SERVER 222

| SAMPLE ID | FEATURE AMOUNT 1 | ... | FEATURE AMOUNT n | PREDICTION TARGET VARIABLE |
|---|---|---|---|---|
| 5 | 9.8 | ... | 3.7 | 1 |
| 6 | -3.5 | ... | 2.3 | 1 |

 EXPECTED RATIO CANNOT BE ACHIEVED

DISTRIBUTION SYSTEM, DATA MANAGEMENT APPARATUS, DATA MANAGEMENT METHOD, AND COMPUTER-READABLE RECORDING MEDIUM

CROSS REFERENCE TO RELATED APPLICATIONS

This application is a National Stage of International Application No. PCT/JP2018/021600 filed Jun. 5, 2018, claiming priority based on U.S. Provisional Application No. 62/515,734, filed Jun. 6, 2017.

TECHNICAL FIELD

The present invention relates to a distribution system, a data management apparatus, a data management method, and a computer-readable recording medium for generating a learning model through distributed processing.

BACKGROUND ART

Distribution systems are systems for shortening processing time by operating a plurality of servers in parallel, and are used for large-scale calculation such as genetic analysis, weather forecast, and decryption. In addition, in recent years, distribution systems, in which a large amount of data is processed, have also been used in the utilization of big data.

FIG. 18 is a configuration diagram illustrating an example of a conventional distribution system. As illustrated in FIG. 18, a distribution system 200 includes a master server 210 and calculation processing servers 220 to 222 that execute calculations. In addition, the master server 210 and the calculation processing servers 220 to 222 are connected via a network 230.

The master server 210 gives an instruction regarding processing to be performed, to the calculation processing servers 220 to 222. Each of the calculation processing servers 220 to 222 executes processing according to the instruction. In addition, the calculation processing servers 220 to 222 can also perform processing autonomously based on data held therein.

Here, operations of servers in a conventional distribution system will be described with reference to FIG. 19. In the following description, each calculation processing server executes machine learning and generates a prediction model. FIG. 19 is a diagram illustrating an example of training data stored in memories of calculation processing servers in a conventional distribution system.

First, the master server 210 instructs the calculation processing servers 220 to 222 constituting the distribution system to read training data into their memories. At this time, each of the calculation processing servers divides the training data to fit within the memory capacity thereof based on the limit of the memory capacity, and reads resulting data.

At this time, the calculation processing servers read the training data irrespective of its content, and thus there is the possibility that there is bias in the distribution of the values in the training data. If the calculation processing servers execute machine learning and learn a prediction model in this state, the following problems arise.

In the example in FIG. 19, the server 220 can perform machine learning only from training data of a positive example (sample whose prediction target variable is "1"), and, as a result, a situation occurs where only a model for predicting a positive example can be learned constantly. In addition, the server 221 can perform machine learning only from training data of a negative example (sample whose prediction target variable is "−1"), and a situation occurs where only a model for predicting a negative example can be learned constantly.

Also, there is the possibility that the distribution of values in original training data being different from the distribution of values in training data in each of the calculation processing servers will cause a fault in a learned prediction model. In addition, there is also the possibility that learning of an accurate prediction model is hindered if the distribution of values in training data in the calculation processing server is not (distribution of values in training data) suitable for an algorithm used in machine learning.

Note that the aforementioned problems can be solved by adopting a method in which each of the calculation processing servers executes machine learning while referencing all of the training data pieces as illustrated in FIG. 20 (for example, see Non-patent Documents 2 and 3). FIG. 20 is a diagram illustrating a case where, in a conventional distribution system, each calculation processing server executes machine learning while referencing training data of the other calculation processing servers. In the example in FIG. 20, each of the calculation processing servers reference training data held in the other calculation processing servers via the network 230.

In addition, the aforementioned problems can also be solved by adopting a method in which each calculation processing server randomly transmits training data to one or more other calculation processing servers, in other words, a method in which training data is transferred between calculation processing servers, as illustrated in FIGS. 21 and 22. FIG. 21 is a diagram illustrating a state before training data is transferred in a case where the training data is transferred between calculation processing servers, in a conventional distribution system. FIG. 22 is a diagram illustrating a state after training data has been transferred in a case where the training data is transferred between the calculation processing servers, in the conventional distribution system.

As illustrated in FIG. 21, the calculation processing servers hold information "rearrangement-destination" for specifying a calculation processing server to which each of the samples that constitute the training data are to be transferred. Each of the calculation processing servers then transmits training data held therein to a calculation processing server designated as "rearrangement-destination". As a result, as illustrated in FIG. 22, sample data is exchanged between calculation processing servers.

LIST OF RELATED ART DOCUMENTS

Non-Patent Document

Non-patent Document 1: Sparks et al. "Automating Model Search for Large Scale Machine Learning." In ACM SoCC, 2015.
Non-patent Document 2: Meng et al. "MLlib: Machine Learning in Apache Spark." Journal of Machine Learning Research 17, pp. 1-7, 2016.

SUMMARY OF INVENTION

Problems to be Solved by the Invention

However, if the method illustrated in FIG. 20 is adopted, each calculation processing server needs to repeatedly read out, via the network, training data held in another calculation processing server. Moreover, the speed at which data is read out via the network is hundreds of times slower than the speed at which data is read out from a memory provided in a calculation processing server itself. Therefore, there is a problem in that the method illustrated in FIG. 20 is very inefficient.

In addition, if the method illustrated in FIGS. 21 and 22 is adopted, there are cases where the limit value of the capacity of the memory of each calculation processing server is exceeded after the training data is transferred, and machine learning can be no longer performed. In the method illustrated in FIGS. 21 and 22, there are also cases where the ratio of positive examples to negative examples in training data is different from a ratio expected from a machine learning algorithm.

An example object of the invention is to provide a distribution system, a data management apparatus, a data management method, and a computer-readable recording medium that solve the aforementioned problems, and can distribute training data to calculators according to machine learning processes performed by the calculators when distributed processing is performed.

Means for Solving the Problems

In order to achieve the aforementioned object, a distribution system according to an example aspect of the invention includes a data management apparatus and a plurality of calculators that execute machine learning, and the data management apparatus includes:

a data acquisition unit configured to acquire information regarding training data held in memories of the plurality of calculators, from the calculators, and a data rearrangement unit configured to determine training data that is to be held in the memory of each of the plurality of calculators, based on characteristics of the machine learning processes that are executed by the plurality of calculators, and the information acquired from the plurality of calculators.

In order to achieve the aforementioned object, a data management apparatus according to an example aspect of the invention is an apparatus for managing training data in a plurality of calculators that execute machine learning, and includes:

a data acquisition unit configured to acquire information regarding training data held in memories of the plurality of calculators, from the calculators; and a data rearrangement unit configured to determine training data that is to be held in the memory of each of the plurality of calculators, based on characteristics of the machine learning processes that are executed by the plurality of calculators, and the information acquired from the plurality of calculators.

In addition, in order to achieve the aforementioned object, a data management method according to an example aspect of the invention is a method for managing training data in a plurality of calculators that execute machine learning, and includes:

(a) a step of acquiring information regarding training data held in memories of the plurality of calculators, from the calculators; and (b) a step of determining training data that is to be held in the memory of each of the plurality of calculators, based on characteristics of the machine learning processes that are executed by the plurality of calculators, and the information acquired from the plurality of calculators.

Furthermore, in order to achieve the aforementioned object, a computer-readable recording medium according to an example aspect of the invention is a computer-readable recording medium in which a program for managing training data in a plurality of calculators that execute machine learning is recorded, the program including instructions that cause a computer to carry out:

(a) a step of acquiring information regarding training data held in memories of the plurality of calculators, from the calculators; and (b) a step of determining training data that is to be held in the memory of each of the plurality of calculators, based on characteristics of the machine learning processes that are executed by the plurality of calculators, and the information acquired from the plurality of calculators.

Advantageous Effects of the Invention

As described above, according to the present invention, training data can be distributed to calculators according to machine learning processes that are performed by the calculators when distributed processing is performed.

BRIEF DESCRIPTION OF THE DRAWINGS

FIG. 2 is a diagram illustrating an example of training data stored initially in memories of calculators in the first example embodiment of the invention.

FIG. 3 is a diagram illustrating an example of a table created by the data management apparatus, in the first example embodiment of the invention.

FIG. 4 is a diagram illustrating a state where servers to which samples are to be rearranged are registered in the table illustrated in FIG. 3.

FIG. 5 is a diagram illustrating a state after training data stored in memories of calculators are rearranged, in the first example embodiment of the invention.

FIG. 8 is a diagram illustrating an example of a memory capacity table that is transmitted by a master server, in the second example embodiment of the invention.

FIG. 9 is a diagram illustrating an example of transmission destination data pieces created in the data management apparatuses, in the second example embodiment of the invention.

FIG. 10 is a diagram illustrating an example of transmission destination data pieces held in the data management apparatuses when a first transmission instruction is given from the master server.

FIG. 11 is a diagram illustrating an example of transmission destination data pieces newly created by the data management apparatuses after a first transmission instruction was given from the master server.

FIG. 12 is a diagram illustrating an example of transmission destination data held in the data management apparatuses when a second transmission instruction is given from the master server.

FIG. 13 is a diagram illustrating a state where a computer to which data is to be transmitted has been changed in the transmission destination data shown in FIG. 12, based on the memory capacity of the server.

FIG. 14 is a diagram illustrating an example of a training data table created in in the second example embodiment of the invention.

FIG. 15 is a diagram illustrating a state after training data stored in memories of calculators has been rearranged in the second example embodiment of the invention.

FIG. 19 is a diagram illustrating an example of training data stored in memories of calculation processing servers, in a conventional distribution system.

FIG. 20 is a diagram illustrating a case where each calculation processing server executes machine learning while referencing training data of the other calculation processing servers, in a conventional distribution system.

FIG. 21 is a diagram illustrating a state before training data is transferred between calculation processing servers, in a conventional distribution system.

FIG. 22 is a diagram illustrating a state after training data has been transferred between calculation processing servers, in a conventional distribution system.

EXAMPLE EMBODIMENT

First Example Embodiment

A distribution system, a data management apparatus, a data management method, and a program in a first example embodiment of the invention will be described below with reference to FIGS. 1 to 6.

[System Configuration]

Figure 1:
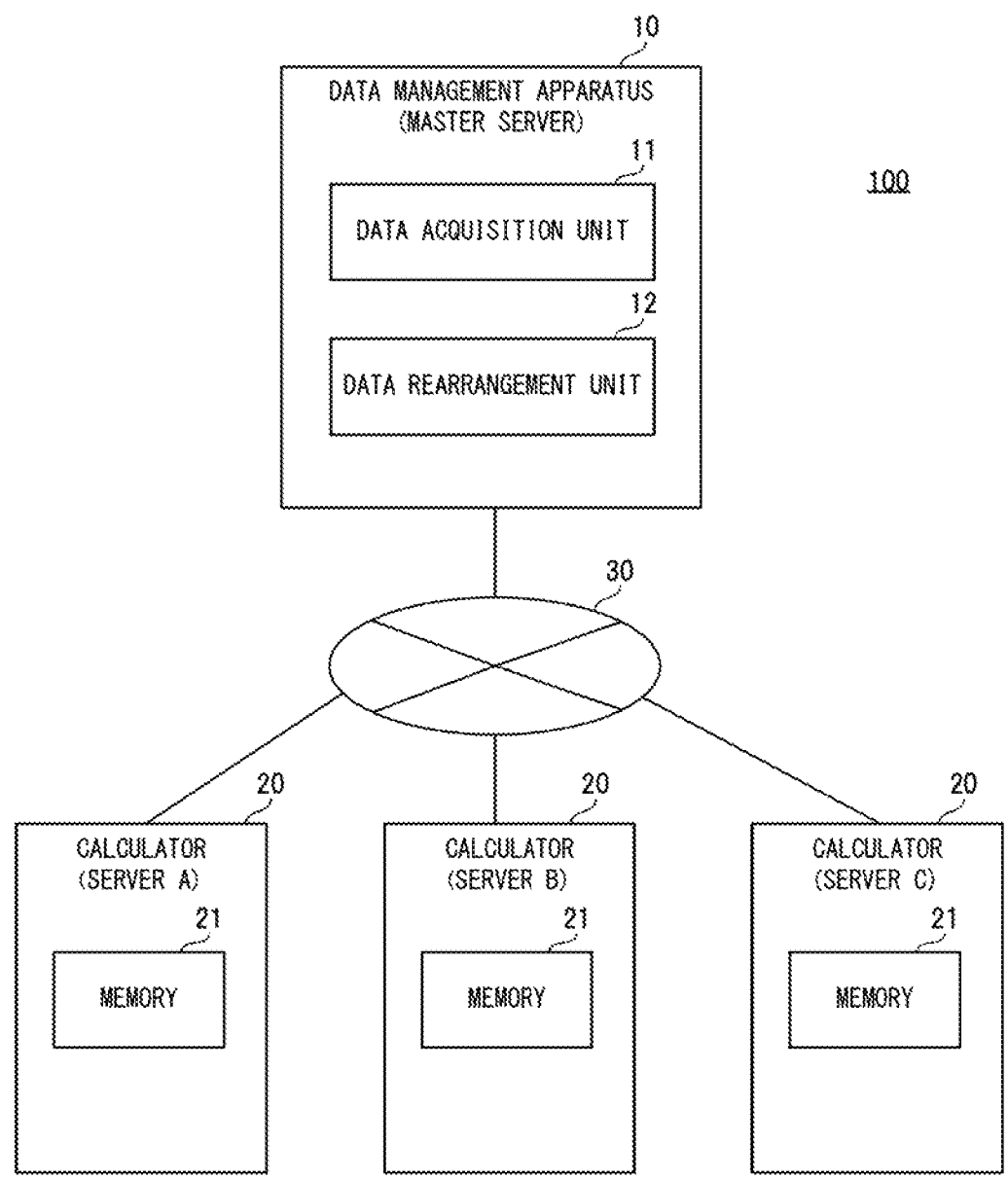
FIG. 1 is a block diagram schematically illustrating a configuration of a distribution system and a data management apparatus in a first example embodiment of the invention.

First, a configuration of the distribution system and the data management apparatus in the first example embodiment will be described. FIG. 1 is a block diagram schematically illustrating a configuration of the distribution system and the data management apparatus in the first example embodiment of the invention.

A distribution system 100 in the first example embodiment illustrated in FIG. 1 is a system for generating a learning model through distributed processing. As illustrated in FIG. 1, the distribution system 100 includes a data management apparatus 10 and a plurality of calculators 20 that execute machine learning. In addition, as illustrated in FIG. 1, the data management apparatus 10 includes a data acquisition unit 11 and a data rearrangement unit 12.

The data acquisition unit 11 acquires, from the plurality of calculators 20, information regarding training data (hereinafter, referred to as "training data information") held in memories 21 of the respective calculators 20. The data rearrangement unit 12 determines training data that is to be held in the memory 21 of each of the plurality of calculators 20, based on the characteristics of machine learning processes that are executed by the calculators 20 and the training data information acquired from the calculators 20.

In this manner, in the first example embodiment, training data information held in the memories of the calculators 20 is collected, and based on the collected training data information, optimum training data to be held in each of the calculators 20 is determined. Therefore, according to the first example embodiment, training data can be distributed to calculators according to machine learning processes that are performed by the respective calculators when distributed processing is performed.

Subsequently, the configuration of the distribution system and the data management apparatus in the first example embodiment will be described in more detail with reference to FIGS. 2 to 4. First, in the first example embodiment, as illustrated in FIG. 1, the data management apparatus 10 is a master server that constitutes the distribution system 100, and is connected to the calculators 20 via a network 30.

In addition, the calculators 20 are servers, and are defined as servers A, B, and C. Note that, in FIG. 1, only three calculators 20 are illustrated, but, in this example embodiment, the number of calculators 20 is not particularly limited.

In the first example embodiment, in the data management apparatus 10, the data acquisition unit 11 acquires prediction target variables of samples constituting training data held in the memory 21 of each of the calculators 20 as information regarding the training data, from the calculators 20.

Specifically, as illustrated in FIG. 2, one or more samples that constitute the training data are stored in the memory 21 of each of the calculators 20. Each sample includes a sample ID, feature amounts 1 to n (n: any natural number), and a prediction target variable. FIG. 2 is a diagram illustrating an example of training data initially stored in memories of calculators, in the first example embodiment of the invention.

In this case, the data acquisition unit 11 causes each of the calculators 20 to transmit the sample IDs and the prediction target variables of the samples stored therein, and creates a table illustrated in FIG. 3 (hereinafter, referred to as "training data table") using the transmitted information. FIG. 3 is a diagram illustrating an example of a table created by the data management apparatus, in the first example embodiment of the invention.

In addition, in this example embodiment, the data rearrangement unit 12 determines training data that is to be held in the memory 21 of each of the calculators 20, such that the ratio of prediction target variables of samples constituting the training data satisfies a set condition.

Specifically, the data rearrangement unit 12 determines samples that are to be held in the memories 21 of the calculators 20 such that the ratio of prediction target variables of samples held in the memory 21 in each of the calculators 20 reaches a ratio that is expected of a machine learning algorithm. Examples of the ratio expected of the machine learning algorithm include a case where the number of prediction target variables of "1" and the number of prediction target variables of "−1" are the same. In addition, at this time, the data rearrangement unit 12 prevents the number of samples to be stored in each of the calculators 20 from exceeding the capacity of the memory 21.

In addition, the data rearrangement unit 12 determines samples that are to be held in the memory 21 of each of the calculators 20, and, as illustrated in FIG. 4, newly registers servers to which samples are to be rearranged, to the training data table illustrated in FIG. 3. FIG. 4 is a diagram illustrating a state where servers to which the samples are to be rearranged are registered in the table shown in FIG. 3.

In addition, the data rearrangement unit 12 transmits the determination result, specifically the table illustrated in FIG. 4, to the calculators 20. Accordingly, each of the calculators 20 transmits some of or all of the samples held in the memory 21 thereof to the other calculators 20, according to the transmitted determination result. As a result, the samples are rearranged, and training data is stored in the memories 21 of the calculators 20 as illustrated in FIG. 5. FIG. 5 is a diagram illustrating a state after training data stored in the memories of the calculators has been rearranged, in the first example embodiment of the invention.

[System Operations]

Figure 6:
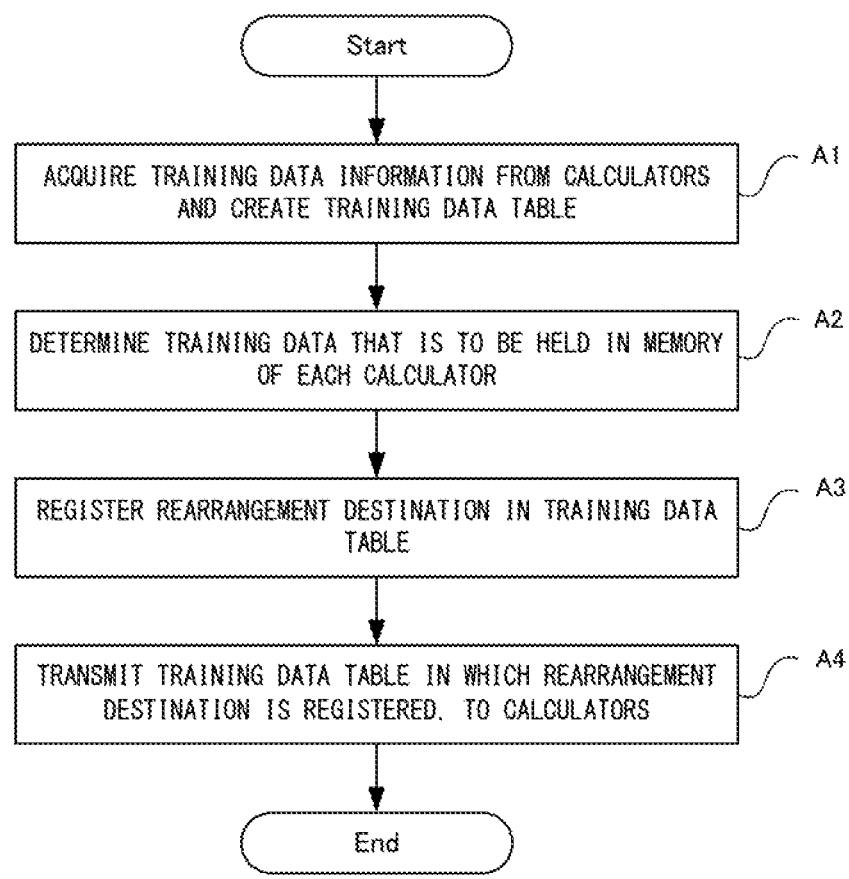
FIG. 6 is a flowchart illustrating operations of the data management apparatus in the first example embodiment of the invention.

Next, operations of the distribution system 100 and the data management apparatus 10 in the first example embodiment will be described with reference to FIG. 6. FIG. 6 is a flowchart illustrating operations of the data management apparatus in the first example embodiment of the invention.

The following description will be given with reference to FIGS. 1 to 5 as appropriate. In addition, in the first example embodiment, the data management method is carried out by causing the data management apparatus 10 to operate. Thus, description of the data management method in the first example embodiment is replaced with the following description of operations of the data management apparatus 10.

As shown in FIG. 6, first, in the data management apparatus 10, the data acquisition unit 11 causes the calculators 20 to transmit sample IDs and prediction target variables of samples as training data information, acquires them, and creates a training data table illustrated in FIG. 3 (step A1).

Next, the data rearrangement unit 12 determines training data that is to be held in the memory 21 of each of the calculators 20 such that the ratio of prediction target variables of samples constituting the training data held in the memory 21 of each of the calculators 20 satisfies a set condition (step A2).

Next, the data rearrangement unit 12 determines samples that are to be held in the memory 21 of each of the calculators 20, and, newly registers servers to which the samples are to be rearranged, to the training data table created in step A1 as illustrated in FIG. 4 (step A3).

Next, the data rearrangement unit 12 transmits the training data table in which servers to which the samples are to be rearranged are registered in step A3, to the calculators 20 (step A4). After executing step A4, each of the calculators 20 transmits some of or all of the samples held in the memory 21 thereof, to other calculators 20, based on the transmitted table. Accordingly, the samples are rearranged, and, as a result, training data is stored in the memories 21 of the calculators 20 as illustrated in FIG. 5.

[Effect of First Example Embodiment]

As described above, according to the first example embodiment, prediction target variables of samples held in the memories of the calculators 20 are gathered as training data information, and the samples are rearranged such that the ratio of prediction target variables is made suitable for the machine learning algorithm. Therefore, according to the first example embodiment, when distributed processing is performed, samples can be distributed to calculators according to machine learning that is performed by the calculators.

[Program]

It suffices for the program in the first example embodiment to be a program for causing a computer to execute steps A1 to A4 shown in FIG. 6. By installing this program to a computer and executing the program, it is possible to realize the data management apparatus 10 and data management method in this example embodiment. In this case, the processor of the computer functions as the data acquisition unit 11 and the data rearrangement unit 12, and performs processing.

In addition, the program in the first example embodiment may also be executed by a computer system constituted by a plurality of computers. In this case, for example, each of the computers may function as one of the data acquisition unit 11 and the data rearrangement unit 12.

Second Example Embodiment

Next, a distribution system, data management apparatuses, a data management method, and a program in a second example embodiment of the invention will be described with reference to FIGS. 7 to 16.

[System Configuration]

Figure 7:
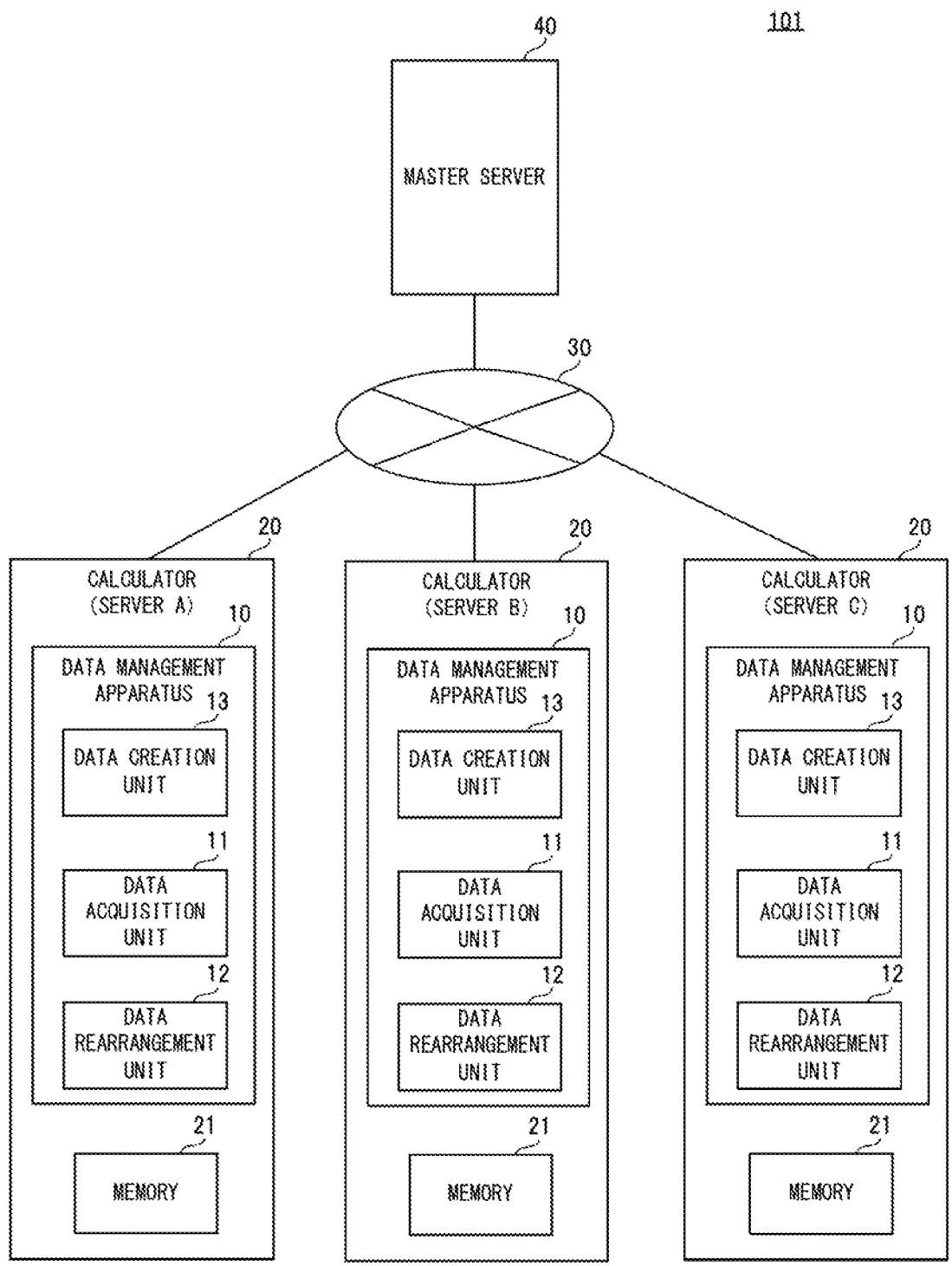
FIG. 7 is a block diagram schematically illustrating a configuration of a distribution system and data management apparatuses in a second example embodiment of the invention.

First, a configuration of the distribution system and data management apparatuses in the second example embodiment will be described. FIG. 7 is a block diagram schematically illustrating a configuration of the distribution system and the data management apparatuses in the second example embodiment of the invention.

As shown in FIG. 7, also in the second example embodiment, similarly to the first example embodiment, a distribution system 101 includes a master server 40 and a plurality of calculators 20, which are connected via a network 30. Note that the distribution system 101 in the second example embodiment differs from the distribution system 100 in the first example embodiment in the configuration of data management apparatuses 10. Description will be given below with a focus on differences from the first example embodiment.

As shown in FIG. 7, in the second example embodiment, a data management apparatus 10 is constructed in each of the calculators 20. Specifically, the data management apparatus 10 is constructed on an operating system of the calculators 20 by the program in the second example embodiment.

In addition, as illustrated in FIG. 7, in the second example embodiment, the data management apparatus 10 provided in each of the calculators 20 includes a data creation unit 13 in addition to the data acquisition unit 11 and the data rearrangement unit 12.

In each of the data management apparatuses 10, the data creation unit 13 first accesses the memory 21 of the calculator 20 in which this data management apparatus 10 is constructed, and determines a calculator 20 to which each of the samples constituting training data held in the memories 21 are to be transmitted.

Specifically, in each of the data management apparatuses 10, the data creation unit 13 randomly determines a calculator 20 to which each sample is to be transmitted without exceeding the memory capacity of the calculator 20, based on a memory capacity table (see FIG. 8) received from the master server 40 in advance. FIG. 8 is a diagram illustrating an example of the memory capacity table that is transmitted by the master server, in the second example embodiment of the invention. As illustrated in FIG. 8, the memory capacities of the calculators 20 are registered in the memory capacity table.

Next, in each of the data management apparatuses 10, the data creation unit 13 creates data for specifying the determined calculators 20 to which the samples are to be transmitted respectively and information regarding training data (hereinafter, referred to as "transmission destination data").

FIG. 9 is a diagram illustrating an example of the transmission destination data that is created in each of the data management apparatuses, in the second example embodiment of the invention. As illustrated in FIG. 9, in this example embodiment, the transmission destination data is created in a table format. Also, in the transmission destination data, a sample ID and prediction target variable of each of the samples held in the corresponding calculator 20, and a calculator to which the sample is to be rearranged (transmitted) are registered.

Next, in each of the data management apparatuses 10, the data creation unit 13 transmits, in accordance with an instruction from the outside, transmission destination data to a calculator 20 designated in the instruction. Specifically, in the second example embodiment, the master server 40 designates a calculator 20 to which each sample is to be transmitted.

For example, assume that, in the example illustrated in FIG. 9, the master server 40 instructs the server A to transmit data to the server A as a transmission designation, instructs the server B to transmit data to the server A, and instructs the server C to transmit data to the server C. In this case, the calculators (the servers A to C) transmit transmission destination data to the designated servers. Note that, here, the servers A and C are instructed to transmit transmission destination data to themselves, and thus, in actuality, these servers hold transmission destination data without transmitting it.

Due to the above-described instruction, transmission destination data pieces are gathered in the servers A and C as illustrated in FIG. 10. FIG. 10 is a diagram illustrating an example of transmission destination data held in the data management apparatuses when a first transmission instruction is given from the master server. In the example in FIG. 10, the server A integrates transmission destination data created by the server A itself and transmission destination data transmitted from the server B, and holds the integrated transmission destination data.

In addition, after transmission destination data created by the data creation unit 13 in each of the data management apparatuses 10 has been transmitted, if the transmission destination data of all of the calculators 20 has not been received by one of the calculators 20, in other words if the servers A and C have received transmission destination data as illustrated in FIG. 10, the data creation unit 13 newly creates transmission destination data.

Specifically, in each of the data management apparatuses 10, as illustrated in FIG. 11, the data creation unit 13 determines a calculator 20 to which each of the samples specified in transmission destination data (see FIG. 10) held in the data creation unit 13 itself are to be transmitted, based on the memory capacity table (see FIG. 8), and newly creates transmission destination data.

FIG. 11 is a diagram illustrating an example of transmission destination data newly created by each data management apparatus after a first transmission instruction has been given from the master server. In the example in FIG. 11, in the server A, the data creation unit 13 has changed the transmission destination of a sample whose sample ID is 4 to the server C.

Assume that, thereafter, in the example in FIG. 11, the master server 40 instructs the server A to transmit data to the server A, and instructs the server C to transmit data to the server A. In this case, the servers A and C transmit transmission destination data to the servers designated in the instruction.

Due to the above-described instruction, transmission destination data pieces are gathered in the server A as illustrated in FIG. 12. FIG. 12 is a diagram illustrating an example of transmission destination data held by each data management apparatus when a second transmission instruction is given from the master server. As a result, in the example in FIG. 12, the server A integrates transmission destination data created by the server A itself and transmission destination data transmitted from the servers B and C, and holds the integrated transmission destination data. The master server 40 gives an instruction to transmit transmission destination data until transmission destination data is gathered in one calculator.

In addition, in this case, in the server A, the data creation unit 13 can also change a calculator 20 to which each of the samples specified by the integrated transmission destination data (see FIG. 11) are to be transmitted, based on the memory capacity table (see FIG. 8), as illustrated in FIG. 13. FIG. 13 is a diagram illustrating a state where a transmission destination calculator is changed based on the memory capacity thereof, in transmission destination data shown in FIG. 12.

In the example in FIGS. 12 and 13, the transmission destination data of all of the calculators 20 has been received by one calculator 20, namely the server A. Therefore, in the data management apparatus 10 constructed in the server A, the data acquisition unit 11 has acquired information regarding training data of all of the calculators 20 (prediction target variables) from all of the received transmission destination data tables.

In this case, in the data management apparatus 10 constructed in the server A, the data rearrangement unit 12 determines training data that is to be held in the memory 21 of each of the calculators 20. Also in the second example embodiment, processing that is performed by the data rearrangement unit 12 is similar to that in the first example embodiment. Specifically, the data rearrangement unit 12 determines training data that is to be held in the memory 21 of each of the calculators 20, such that the ratio of prediction target variables of samples constituting the training data held in the memory 21 of the calculator 20 satisfies a set condition.

Specifically, the data rearrangement unit 12 determines samples that are to be held in the memory 21 of each of the calculators 20 such that, in the calculator 20, the ratio of prediction target variables of the samples held in the memory 21 reaches a ratio expected of the machine learning algorithm.

In addition, after the determination is made, similarly to the first example embodiment, the data rearrangement unit 12 creates a training data table in which calculators to which samples are to be rearranged are registered, as illustrated in FIG. 14. FIG. 14 is a diagram illustrating an example of the training data table created in the second example embodiment of the invention. Note that the training data table shown in FIG. 14 is created based on the transmission destination data shown in FIG. 13.

Next, the data rearrangement unit 12 transmits the table shown in FIG. 14 to the calculators 20. Accordingly, each of the calculators 20 transmit some of or all of the samples held in the memory 20 thereof, to one or more other calculators 20, according to the transmitted determination result. As a result, samples are rearranged, and training data is stored in the memories 21 of the calculators 20 as illustrated in FIG. 15. FIG. 15 is a diagram illustrating a state after training data stored in the memories of the calculators has been rearranged, in the second example embodiment of the invention.

[System Operations]

Figure 16:
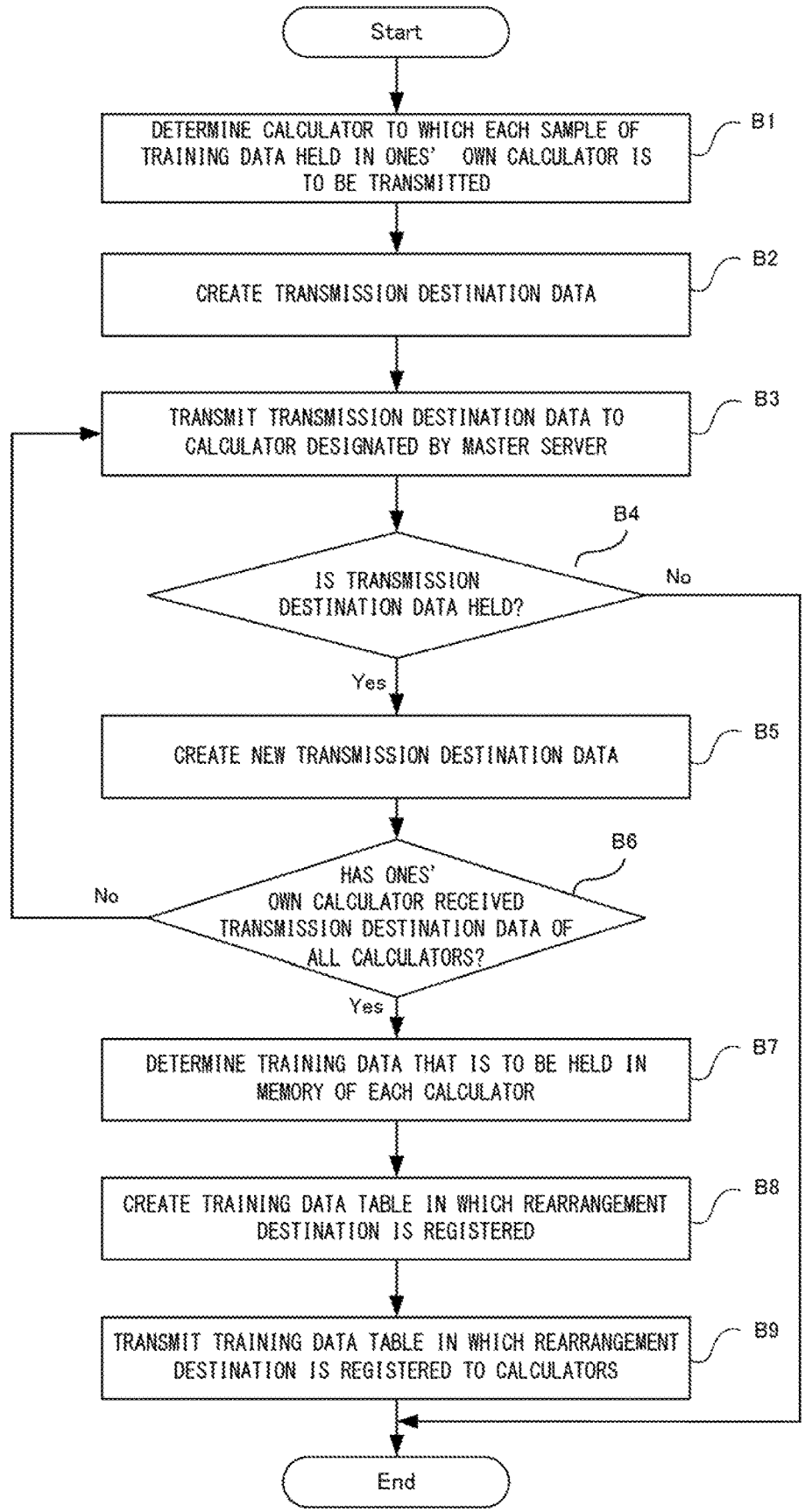
FIG. 16 is a flowchart illustrating operations of a data management apparatus in the second example embodiment of the invention.

Next, operations of the distribution system 101 and the data management apparatuses 10 in the second example embodiment will be described with reference to FIG. 16. FIG. 16 is a flowchart illustrating operations of a data management apparatus in the second example embodiment of the invention. The following description will be given with reference to FIGS. 7 to 16 as appropriate. In addition, in the second example embodiment, a data management method is carried out by causing the data management apparatuses 10 to operate. Thus, description of the data management method in the second example embodiment is replaced with the following description of operations of the data management apparatuses 10.

First, assume that the master server 40 transmits the memory capacity table shown in FIG. 8 to the data management apparatuses 10 in advance. Accordingly, each of the data management apparatuses 10 acquire the memory capacity table. In addition, operations will be described below with a focus on a data management apparatus 10 constructed in any calculator 20.

As shown in FIG. 16, first, the data creation unit 13 randomly determines a calculator 20 to which each sample is to be transmitted, based on the memory capacity table received from the master server 40 in advance, without exceeding the memory capacity of the calculator 20 (step B1). Note that, also in the second example embodiment, similarly to the first example embodiment, training data is initially stored in the memories 21 of the calculators 20 as illustrated in FIG. 2.

Next, in each of the data management apparatuses 10, the data creation unit 13 creates transmission destination data (see FIG. 9) for specifying a server to which each sample is to be transmitted, and that was determined in step B1, and information regarding training data (prediction target variables) (step B2).

Next, when an instruction is given from the master server 40, the data creation unit 13 transmits the transmission destination data to calculators 20 designated in the instruction (step B3).

Next, after executing step B3, the data creation unit 13 determines whether or not transmission destination data is held (step B4). For example, in the example in FIG. 10, if the data management apparatus 10 that includes the data creation unit 13 is constructed in the server B, which is a calculator 20, the data creation unit 13 determines that no transmission destination data is held. Accordingly, processing in the data management apparatus 10 ends.

On the other hand, in the example in FIG. 10, if the data management apparatus 10 that includes the data creation unit 13 is constructed in the server A or C, which is a calculator 20, the data creation unit 13 determines that transmission destination data is held. In this case, the data creation unit 13 newly creates transmission destination data (step B5).

Specifically, in step B5, as illustrated in FIG. 11, in each data management apparatus 10, the data creation unit 13 determines a calculator 20 to which each of the samples specified by the transmission destination data (see FIG. 10) held therein are to be transmitted, based on the memory capacity table (see FIG. 8), and newly creates transmission destination data.

Next, after executing step B5, the data creation unit 13 determines whether or not the calculator 20 in which the data management apparatus 10 that includes this data creation unit 13 is constructed has received the transmission destination data of all of the calculators 20 (step B6). As a result of the determination made in step B6, if the calculator 20 in which the data management apparatus 10 is constructed has not received the transmission destination data of all of the calculators 20, the data creation unit 13 executes step B3 again.

On the other hand, as a result of the determination made in step B6, if the calculator 20 in which the data management apparatus 10 is constructed has received the transmission destination data of all of the calculators 20, steps B7 to B9 are executed if, for example, in the example in FIG. 12, the data management apparatus 10 is constructed in the server A.

In step B7, the data rearrangement unit 12 determines training data that is to be held in the memory 21 of each of the calculators 20 (step B7). Specifically, the data rearrangement unit 12 determines training data that is to be held in the memory 21 of each of the calculators 20 such that the ratio of prediction target variables of samples that constitute training data held in the memory 21 of the calculator 20 satisfies a set condition.

Next, when determining samples that are to be held in the memory 21 of each of the calculators 20, the data rearrangement unit 12 newly registers a calculator to which each sample is to be rearranged, in integrated transmission destination data (FIG. 13) as illustrated in FIG. 14, and creates a training data table (step B8).

Next, the data rearrangement unit 12 transmits the training data table created in step B9 to the calculators 20 (step B9). After executing step B9, each of the calculators 20 transmit some of or all of the samples held in the memory 21 thereof, to other calculators 20 based on the transmitted table. Accordingly, the samples are rearranged, and, as a result, training data is stored in the memories 21 of the calculators 20 as illustrated in FIG. 15

[Effect of Second Embodiment]

As described above, also in the second example embodiment, prediction target variables of samples held in the memories of the calculators 20 are collected as pieces of training data information, and the samples are rearranged such that the ratio of the prediction target variables thereof is suitable for the machine learning algorithm. Therefore, also according to the second example embodiment, similarly to the first example embodiment, when distributed processing is performed, samples can be distributed to calculators according to machine learning that is performed by the calculators. In addition, in the second example embodiment, processing is performed in each of the calculators 20, and thus the load of the master server 40 can be reduced.

[Program]

It suffices for a program in the second example embodiment to be a program for causing a computer to execute steps B1 to B9 shown in FIG. 16. By installing this program in a computer, and executing it, it is possible to realize the data management apparatuses 10 and the data management method in this example embodiment. In this case, the processor of the computer functions as the data acquisition unit 11, the data rearrangement unit 12, and the data creation unit 13, and performs processing.

In addition, the program in the second example embodiment may be executed by a computer system constituted by a plurality of computers. In this case, for example, each of the computers may function as one of the data acquisition unit 11, the data rearrangement unit 12, and the data creation unit 13.

(Physical Configuration)

Figure 17:
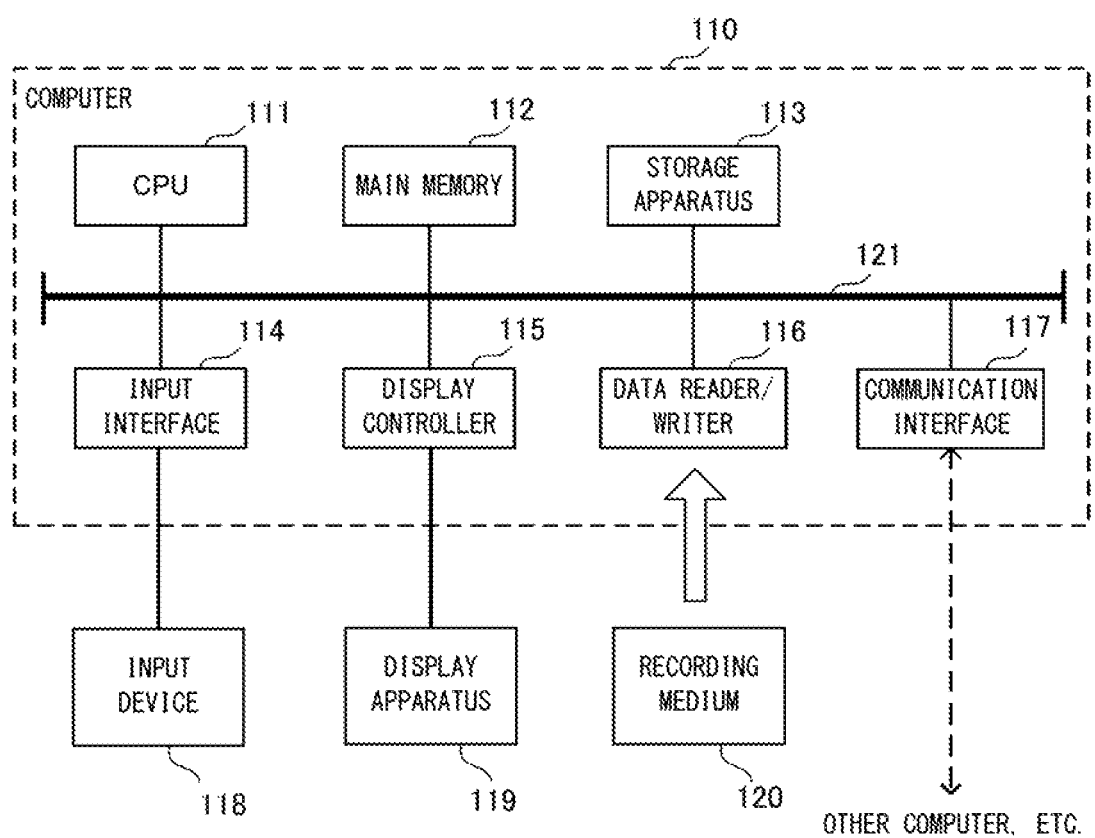
FIG. 17 is a block diagram illustrating an example of a computer for realizing the data management apparatus in the first and second example embodiments of the invention.
Figure 18:
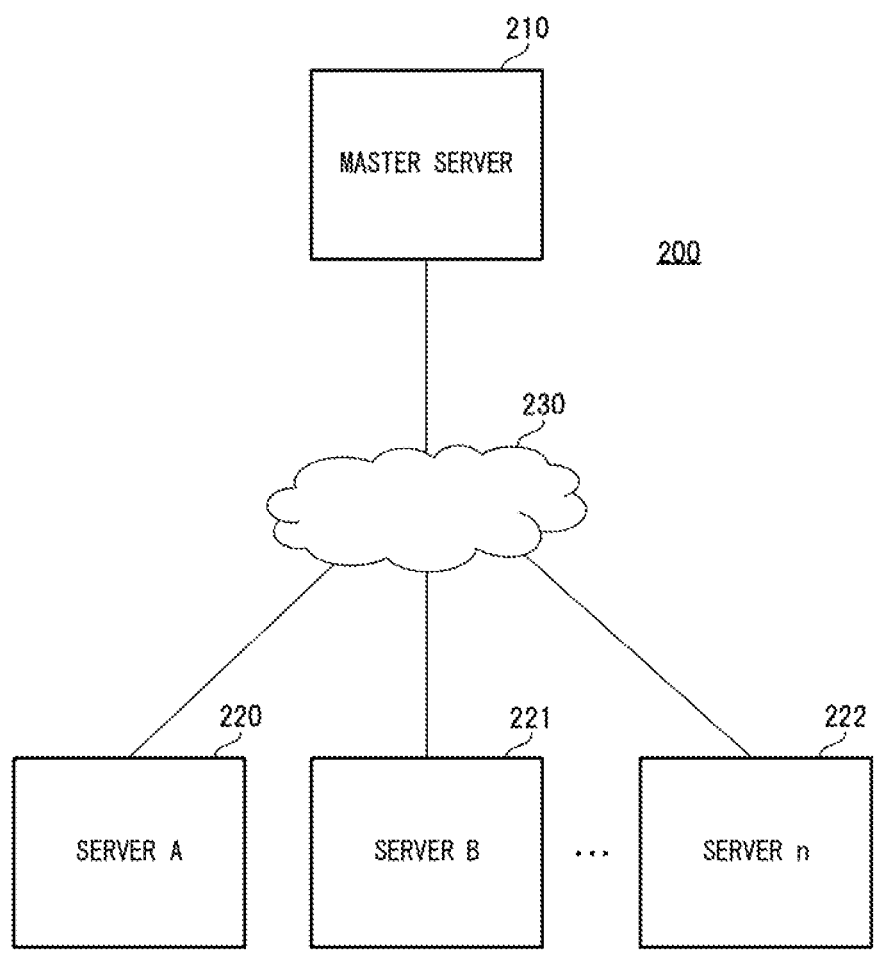
FIG. 18 is a configuration diagram illustrating an example of a conventional distribution system.

Here, a computer for realizing a data management apparatus 10 by executing the program in the first and second example embodiments will be described with reference to FIG. 17. FIG. 17 is a block diagram illustrating an example of a computer for realizing the data management apparatus in the first and second example embodiments of the invention. Note that the computer as mentioned herein is actually a master server or a calculator (server).

As illustrated in FIG. 17, a computer 110 includes a CPU (Central Processing Unit) 111, a main memory 112, a storage apparatus 113, an input interface 114, a display controller 115, a data reader/writer 116, and a communication interface 117. These constituent elements are connected via a bus 121 to enable mutual data communication. Note that the computer 110 may also include a GPU (Graphics Processing Unit) or an FPGA (Field-Programmable Gate Array), in addition to the CPU 111 or in place of the CPU 111.

The CPU 111 carries out various types of calculation by deploying, in the main memory 112, program (codes) in this example embodiment stored in the storage apparatus 113, and executing the codes in a predetermined order. Typically, the main memory 112 is a volatile storage apparatus such as a DRAM (Dynamic Random Access Memory). In addition, the program in this example embodiment is provided in a state of being stored in a computer-readable recording medium 120. Note that the program in this example embodiment may also be distributed on the Internet connected via the communication interface 117.

In addition, specific examples of the storage apparatus 113 include a hard disk drive and a semiconductor storage apparatus such as a flash memory. The input interface 114 mediates data transmission between the CPU 111 and an input device 118 including a keyboard and a mouse. The display controller 115 is connected to a display apparatus 119 to control display on the display apparatus 119.

The data reader/writer 116 mediates data transmission between the CPU 111 and the recording medium 120, reads out a program from the recording medium 120, and writes a processing result of the computer 110 to the recording medium 120. The communication interface 117 mediates data transmission between the CPU 111 and another computer.

Furthermore, specific examples of the recording medium 120 include a general-purpose semiconductor storage device such as a Compact Flash (CF (registered trademark)) and a Secure Digital (SD), a magnetic recording medium such as a flexible disk, or an optical recording medium such as a Compact Disk Read Only Memory (CD-ROM).

Note that the data management apparatus 10 in the first and second example embodiments can also be realized by using items of hardware corresponding to the units, instead of a computer in which programs are installed. Furthermore, a configuration may also be adopted in which a portion of the data management apparatus 10 is realized by a program, and the remaining portion is realized by hardware.

Part of or all of the above-described example embodiments can be expressed in the below-described Supplementary Notes 1 to 20, but the present invention is not limited to the below description.

(Supplementary Note 1)
A distribution system including:
a data management apparatus; and a plurality of calculators that execute machine learning,
wherein the data management apparatus includes:
a data acquisition unit configured to acquire information regarding training data held in memories of the plurality of calculators, from the calculators, and
a data rearrangement unit configured to determine training data that is to be held in the memory of each of the plurality of calculators, based on characteristics of the machine learning processes that are executed by the plurality of calculators, and the information acquired from the plurality of calculators.

(Supplementary Note 2)
The distribution system according to Supplementary Note 1,
wherein, in the data management apparatus,
the data acquisition unit acquires prediction target variables of respective samples constituting training data held in the memory of each of the plurality of calculators, as information regarding the training data, from the calculator, and
the data rearrangement unit determines training data that is to be held in the memory of each of the plurality of calculators such that a ratio of prediction target variables of samples constituting the training data held in the memory of the calculator satisfies a set condition.

(Supplementary Note 3)
The distribution system according to Supplementary Note 1 or 2,
wherein the data rearrangement unit transmits a determination result to the plurality of calculators, and
each of the plurality of calculators transmits some of or the entirety of the training data held in the memory of the calculator, to another calculator according to the transmitted determination result.

(Supplementary Note 4)
The distribution system according to Supplementary Note 1 or 2,
wherein the data management apparatus is constituted by each of the plurality of calculators,
each data management apparatus further includes a data creation unit configured to determine a calculator to which each sample constituting training data held in the memory of the calculator that constitutes the data management apparatus is to be transmitted, create data for specifying the determined calculator to which each of the samples are to be transmitted and the information regarding the training data, and, furthermore, according to an instruction from the outside, transmit the data to a calculator in the instruction, and
when the data of all of the calculators has been received by one calculator, and the data acquisition unit of the data management apparatus constituted by the calculator can acquire, from the received data of all of the calculators, the information regarding the training data of all of the plurality of calculators, the data rearrangement unit of the data management apparatus determines training data that is to be held in the memory of each of the plurality of calculators.

(Supplementary Note 5)
The distribution system according to Supplementary Note 4,
wherein, if, after the data creation unit in each of the data management apparatuses has transmitted the data, the data of all of the calculators is not received by one calculator,
the data creation unit determines a calculator to which each sample specified by the data held in the data creation unit is to be transmitted, based on a capacity of the memory of the calculator, newly creates data for specifying the determined calculator to which each sample is to be transmitted and the information regarding the training data, and, when an instruction is newly given from the outside, transmits the new data to a calculator in the instruction.

(Supplementary Note 6)
A data management apparatus for managing training data in a plurality of calculators that execute machine learning, the apparatus including:
a data acquisition unit configured to acquire information regarding training data held in memories of the plurality of calculators, from the calculators; and a data rearrangement unit configured to determine training data that is to be held in the memory of each of the plurality of calculators, based on characteristics of the machine learning processes that are executed by the plurality of calculators, and the information acquired from the plurality of calculators.

(Supplementary Note 7)

The data management apparatus according to Supplementary Note 6, wherein the data acquisition unit acquires prediction target variables of respective samples constituting training data held in the memory of each of the plurality of calculators, as the information regarding the training data, from the calculator, and the data rearrangement unit determines training data that is to be held in the memory of each of the plurality of calculators such that a ratio of prediction target variables of samples constituting the training data held in the memory of the calculator satisfies a set condition.

(Supplementary Note 8)

The data management apparatus according to Supplementary Note 6 or 7, wherein the data rearrangement unit transmits a determination result to the plurality of calculators, and causes each of the plurality of calculators to transmit some of or the entirety of the training data held in the memory of the calculator, to another calculator according to the transmitted determination result.

(Supplementary Note 9)

The data management apparatus according to Supplementary Note 6 or 7, wherein, if the data management apparatus is constituted by one of the plurality of calculators, the data management apparatus further includes a data creation unit configured to determine a calculator to which each sample constituting training data held in the memory of the calculator that constitutes the data management apparatus is to be transmitted, create data for specifying the determined calculator to which each of the samples are to be transmitted and the information regarding the training data, and, furthermore, according to an instruction from the outside, transmit the data to a calculator in the instruction, and when the data of all of the calculators has been received by the calculator, and the data acquisition unit can acquire, from the received data of all of the calculators, the information regarding the training data of all of the plurality of calculators, the data rearrangement unit determines training data that is to be held in the memory of each of the plurality of calculators.

(Supplementary Note 10)

The data management apparatus according to Supplementary Note 9, wherein, if, after the data creation unit has transmitted the data, the data of all of the calculators is not received by the calculator, the data creation unit determines a calculator to which each sample specified by the data held in the data creation unit is to be transmitted, based on a capacity of the memory of the calculator, newly creates data for specifying the determined calculator to which each sample is to be transmitted and the information regarding the training data, and, when an instruction is newly given from the outside, transmits the new data to a calculator in the instruction.

(Supplementary Note 11)

A data management method for managing training data in a plurality of calculators that execute machine learning, the method including:

(a) a step of acquiring information regarding training data held in memories of the plurality of calculators, from the calculators; and (b) a step of determining training data that is to be held in the memory of each of the plurality of calculators, based on characteristics of the machine learning processes that are executed by the plurality of calculators, and the information acquired from the plurality of calculators.

(Supplementary Note 12)

The data management method according to Supplementary Note 11, wherein, in the (a) step, prediction target variables of respective samples constituting training data held in the memory of each of the plurality of calculators are acquired as the information regarding the training data, from the calculator, and in the (b) step, training data that is to be held in the memory of each of the plurality of calculators is determined such that a ratio of prediction target variables of samples constituting the training data held in the memory of the calculator satisfies a set condition.

(Supplementary Note 13)

The data management method according to Supplementary Note 11 or 12, wherein, in the (b) step, a determination result is transmitted to the plurality of calculators, and each of the plurality of calculators is caused to transmit some of or the entirety of the training data held in the memory of the calculator, to another calculator according to the transmitted determination result.

(Supplementary Note 14)

The data management method according to Supplementary Note 11 or 12, further including (c) a step of determining a calculator to which each sample constituting training data held in the memory of each of the plurality of calculators is to be transmitted, creating data for specifying the determined calculator to which each of the samples are to be transmitted and the information regarding the training data, and, furthermore, according to an instruction from the outside, transmitting the data to a calculator in the instruction, wherein, if the information regarding the training data of all of the plurality of calculators can be acquired in the (a) step, training data that is to be held in the memory of each of the plurality of calculators is determined in the (b) step.

(Supplementary Note 15)

The data management method according to Supplementary Note 14, further including (d) a step of, if, after the data has been transmitted in the (c) step, information regarding the training data of all of the plurality of calculators cannot be acquired in the (a) step, determining a calculator to which each sample specified by the data is to be transmitted, based on a capacity of the memory of the calculator, newly creating data for specifying the determined calculator to which each sample is to be transmitted and the information regarding the training data, and, when an instruction is newly given from the outside, transmitting the new data to a calculator in the instruction.

(Supplementary Note 16)

A computer-readable recording medium in which a program for managing training data in a plurality of calculators that execute machine learning is recorded, the program including instructions that cause a computer to carry out:

(a) a step of acquiring information regarding training data held in memories of the plurality of calculators, from the calculators; and (b) a step of determining training data that is to be held in the memory of each of the plurality of calculators, based on characteristics of the machine learning processes that are executed by the plurality of calculators, and the information acquired from the plurality of calculators.

(Supplementary Note 17)

The computer-readable recording medium according to Supplementary Note 16, wherein, in the (a) step, prediction target variables of respective samples constituting training data held in the memory of each of the plurality of calculators are acquired as the information regarding the training data, from the calculators, and in the (b) step, training data that is to be held in the memory of each of the plurality of calculators is determined such that a ratio of prediction target variables of samples constituting the training data held in the memory of the calculator satisfies a set condition.

(Supplementary Note 18)

The computer-readable recording medium according to Supplementary Note 16 or 17, wherein, in the (b) step, a determination result is transmitted to the plurality of calculators, and each of the plurality of calculators is caused to transmit some of or the entirety of the training data held in the memory of the calculator, to another calculator according to the transmitted determination result.

(Supplementary Note 19)

The computer-readable recording medium according to Supplementary Note 16 or 17, wherein the program further includes instructions that cause a computer to carry out:

(c) a step of determining a calculator to which each sample constituting training data held in the memory of each of the plurality of calculators is to be transmitted, creating data for specifying the determined calculator to which each of the samples are to be transmitted and the information regarding the training data, and, furthermore, according to an instruction from the outside, transmitting the data to a calculator in the instruction, wherein, if the information regarding the training data of all of the plurality of calculators can be acquired in the (a) step, training data that is to be held in the memory of each of the plurality of calculators is determined in the (b) step.

(Supplementary Note 20)

The computer-readable recording medium according to Supplementary Note 19, wherein the program further includes instructions that cause a computer to carry out:

(d) a step of, if, after the data has been transmitted in the (c) step, the information regarding the training data of all of the plurality of calculators cannot be acquired in the (a) step, determining a calculator to which each sample specified by the data is to be transmitted, based on a capacity of the memory of the calculator, newly creating data for specifying the determined calculator to which each sample is to be transmitted and the information regarding the training data, and, when an instruction is newly given from the outside, transmitting the new data to a calculator in the instruction.

Although the present invention has been described above with reference to the example embodiments above, the invention is not limited to the above example embodiments. Various modifications understandable to a person skilled in the art can be made to configurations and details of the invention, within the scope of the invention.

INDUSTRIAL APPLICABILITY

As described above, according to the invention, when distributed processing is performed, training data can be distributed to calculators according to machine learning processes that are performed by the calculators. The invention is useful when machine learning is performed on a large amount of data, in a distribution system.

LIST OF REFERENCE SIGNS

10 Data management apparatus
11 Data acquisition unit
12 Data rearrangement unit
13 Data creation unit
20 Calculator
21 Memory
30 Network
40 Master server
100 Distribution system
110 Computer
111 CPU
112 Main memory
113 Storage apparatus
114 Input interface
115 Display controller
116 Data reader/writer
117 Communication interface
118 Input device
119 Display apparatus
120 Recording medium
121 Bus

The invention claimed is:

1. A distribution system comprising:
a data management apparatus; and a plurality of calculators that execute machine learning,
wherein the data management apparatus comprises
at least one memory having instructions stored therein;
a processor that when executing the instructions, implements:
    a data acquisition unit configured to acquire information regarding training data held in memories of the plurality of calculators, from the calculators, and
    a data rearrangement unit configured to determine training data that is to be held in the memory of each of the plurality of calculators, based on characteristics of the machine learning processes that are executed by the plurality of calculators, and the information acquired from the plurality of calculators,
wherein the data management apparatus is constituted by each of the plurality of calculators,
the processor of each data management apparatus is further configured to implement a data creation unit configured to determine a calculator to which each sample constituting training data held in the memory of the calculator that constitutes the data management apparatus is to be transmitted, create data for specifying the determined calculator to which each of the samples are to be transmitted and the information regarding the training data, and, furthermore, according to an instruction from the outside, transmit the data to a calculator in the instruction, and when the data of all of the calculators has been received by one calculator, and the data acquisition unit of the data management apparatus constituted by the calculator can acquire, from the received data of all of the calculators, the information regarding the training data of all of the plurality of calculators, the data rearrangement unit of the data management apparatus determines training data that is to be held in the memory of each of the plurality of calculators.

2. The distribution system according to claim 1, wherein, in the data management apparatus,
the data acquisition unit acquires prediction target variables of respective samples constituting training data held in the memory of each of the plurality of calculators, as information regarding the training data, from the calculators, and
the data rearrangement unit determines training data that is to be held in the memory of each of the plurality of calculators such that a ratio of prediction target variables of samples constituting the training data held in the memory of the calculator satisfies a set condition.

3. The distribution system according to claim 1, wherein the data rearrangement unit transmits a determination result to the plurality of calculators, and
each of the plurality of calculators transmits some of or the entirety of the training data held in the memory of the calculator, to another calculator according to the transmitted determination result.

4. The distribution system according to claim 1, wherein, if, after the data creation unit in each of the data management apparatuses has transmitted the data, the data of all of the calculators is not received by one calculator,
the data creation unit determines a calculator to which each sample specified by the data held in the data creation unit is to be transmitted, based on a capacity of the memory of the calculator, newly creates data for specifying the determined calculator to which each sample is to be transmitted and the information regarding the training data, and, when an instruction is newly given from the outside, transmits the new data to a calculator in the instruction.

5. A data management apparatus for managing training data in a plurality of calculators that execute machine learning, the apparatus comprising:
a computer implementing:
a data acquisition unit configured to acquire information regarding training data held in memories of the plurality of calculators, from the calculators; and
a data rearrangement unit configured to determine training data that is to be held in the memory of each of the plurality of calculators, based on characteristics of the machine learning processes that are executed by the plurality of calculators, and the information acquired from the plurality of calculators,
wherein, if the data management apparatus is constituted by one of the plurality of calculators,
the data management apparatus further includes a data creation unit, implemented by the computer, configured to determine a calculator to which each sample constituting training data held in the memory of the calculator that constitutes the data management apparatus is to be transmitted, create data for specifying the determined calculator to which each of the samples are to be transmitted and the information regarding the training data, and, furthermore, according to an instruction from the outside, transmit the data to a calculator in the instruction, and
when the data of all of the calculators has been received by the calculator, and the data acquisition unit can acquire, from the received data of all of the calculators, the information regarding the training data of all of the plurality of calculators, the data rearrangement unit determines training data that is to be held in the memory of each of the plurality of calculators.

6. The data management apparatus according to according to claim 5,
wherein the data acquisition unit acquires prediction target variables of respective samples constituting training data held in the memory of each of the plurality of calculators, as the information regarding the training data, from the calculators, and
the data rearrangement unit determines training data that is to be held in the memory of each of the plurality of calculators such that a ratio of prediction target variables of samples constituting the training data held in the memory of the calculator satisfies a set condition.

7. The data management apparatus according to according to claim 5,
wherein the data rearrangement unit transmits a determination result to the plurality of calculators, and causes each of the plurality of calculators to transmit some of or the entirety of the training data held in the memory of the calculator, to another calculator according to the transmitted determination result.

8. The data management apparatus according to claim 5,
wherein, if, after the data creation unit has transmitted the data, the data of all of the calculators is not received by the calculator,
the data creation unit determines a calculator to which each sample specified by the data held in the data creation unit is to be transmitted, based on a capacity of the memory of the calculator, newly creates data for specifying the determined calculator to which each sample is to be transmitted and the information regarding the training data, and, when an instruction is newly given from the outside, transmits the new data to a calculator in the instruction.

9. A data management method performed by a computer for managing training data in a plurality of calculators that execute machine learning, the method comprising:
(a) acquiring information regarding training data held in memories of the plurality of calculators, from the calculators;
(b) determining training data that is to be held in the memory of each of the plurality of calculators, based on characteristics of the machine learning processes that are executed by the plurality of calculators, and the information acquired from the plurality of calculators; and
(c) determining a calculator to which each sample constituting training data held in the memory of each of the plurality of calculators is to be transmitted, creating data for specifying the determined calculator to which each of the samples are to be transmitted and the information regarding the training data, and, furthermore, according to an instruction from the outside, transmitting the data to a calculator in the instruction,
wherein, if the information regarding the training data of all of the plurality of calculators can be acquired in the (a), training data that is to be held in the memory of each of the plurality of calculators is determined in the (b).

10. The data management method according to claim 9,
wherein, in the (a), prediction target variables of respective samples constituting training data held in the memory of each of the plurality of calculators are acquired as the information regarding the training data, from the calculators, and in the (b), training data that is to be held in the memory of each of the plurality of calculators is determined such that a ratio of prediction target variables of samples constituting the training data held in the memory of the calculator satisfies a set condition.

11. The data management method according to claim 9,
wherein, in the (b), a determination result is transmitted to the plurality of calculators, and each of the plurality of calculators is caused to transmit some of or the entirety of the training data held in the memory of the calculator, to another calculator according to the transmitted determination result.

12. The data management method according to claim 9, further comprising (d) if, after the data has been transmitted in the (c) step, information regarding the training data of all of the plurality of calculators cannot be acquired in the (a), determining a calculator to which each sample specified by the data is to be transmitted, based on a capacity of the memory of the calculator, newly creating data for specifying the determined calculator to which each sample is to be transmitted and the information regarding the training data, and, when an instruction is newly given from the outside, transmitting the new data to a calculator in the instruction.

13. A non-transitory computer-readable recording medium in which a program for managing training data in a plurality of calculators that execute machine learning is recorded, the program including instructions that, when loaded in a memory, cause a computer processor to carry out operations comprising:

(a) a step of acquiring information regarding training data held in memories of the plurality of calculators, from the calculators;

(b) a step of determining training data that is to be held in the memory of each of the plurality of calculators, based on characteristics of the machine learning processes that are executed by the plurality of calculators, and the information acquired from the plurality of calculators; and (c) a step of determining a calculator to which each sample constituting training data held in the memory of each of the plurality of calculators is to be transmitted, creating data for specifying the determined calculator to which each of the samples are to be transmitted and the information regarding the training data, and, furthermore, according to an instruction from the outside, transmitting the data to a calculator in the instruction, wherein, if the information regarding the training data of all of the plurality of calculators can be acquired in the (a) step, training data that is to be held in the memory of each of the plurality of calculators is determined in the (b) step.

14. The non-transitory computer-readable recording medium according to claim 13, wherein, in the (a) step, prediction target variables of respective samples constituting training data held in the memory of each of the plurality of calculators are acquired as the information regarding the training data, from the calculators, and in the (b) step, training data that is to be held in the memory of each of the plurality of calculators is determined such that a ratio of prediction target variables of samples constituting the training data held in the memory of the calculator satisfies a set condition.

15. The non-transitory computer-readable recording medium according to claim 13, wherein, in the (b) step, a determination result is transmitted to the plurality of calculators, and each of the plurality of calculators is caused to transmit some of or the entirety of the training data held in the memory of the calculator, to another calculator according to the transmitted determination result.

16. The non-transitory computer-readable recording medium according to claim 13, wherein the program further includes instructions that cause a computer processor to carry out:

(d) a step of, if, after the data has been transmitted in the (c) step, the information regarding the training data of all of the plurality of calculators cannot be acquired in the (a) step, determining a calculator to which each sample specified by the data is to be transmitted, based on a capacity of the memory of the calculator, newly creating data for specifying the determined calculator to which each sample is to be transmitted and the information regarding the training data, and, when an instruction is newly given from the outside, transmitting the new data to a calculator in the instruction.

* * * * *